United States Patent
Latour et al.

(10) Patent No.: US 7,566,075 B2
(45) Date of Patent: Jul. 28, 2009

(54) SEAT BELT SHOULDER GUIDE

(75) Inventors: Aaron R. Latour, Essex (CA); George M. Chalhoub, Livonia, MI (US); Ryuji Matsuda, Nagoya (JP)

(73) Assignees: Toyota Motor Engineering & Manufacturing North America, Inc., Erlanger, KY (US); Quality Safety Systems, Tecumseh (CA)

( * ) Notice: Subject to any disclaimer, the term of this patent is extended or adjusted under 35 U.S.C. 154(b) by 96 days.

(21) Appl. No.: 11/671,269

(22) Filed: Feb. 5, 2007

(65) Prior Publication Data

US 2007/0187939 A1    Aug. 16, 2007

Related U.S. Application Data

(60) Provisional application No. 60/765,686, filed on Feb. 6, 2006.

(51) Int. Cl.
*B60R 22/00* (2006.01)
(52) U.S. Cl. .................... 280/808; 297/483
(58) Field of Classification Search ........... 280/808; 297/473, 483
See application file for complete search history.

(56) References Cited

U.S. PATENT DOCUMENTS

| | | | | |
|---|---|---|---|---|
| 3,279,852 | A | | 10/1966 | Eubank |
| 3,929,351 | A | * | 12/1975 | Fricko ................... 297/475 |
| 3,959,855 | A | | 6/1976 | Fisher |
| 4,023,826 | A | | 5/1977 | Kokubo et al. |
| 4,102,020 | A | * | 7/1978 | Lindblad ................ 24/164 |
| 4,306,735 | A | | 12/1981 | Pfeiffer et al. |
| 4,378,947 | A | * | 4/1983 | Fohl ...................... 280/808 |
| 4,420,172 | A | * | 12/1983 | Kojima .................. 280/802 |
| 4,549,769 | A | * | 10/1985 | Pilarski .................. 297/483 |
| 4,642,853 | A | * | 2/1987 | Plesniarski et al. ..... 24/163 R |
| 4,762,338 | A | * | 8/1988 | Hayden .................. 280/801.1 |
| 5,037,135 | A | * | 8/1991 | Kotikovsky et al. ..... 280/808 |
| 5,257,820 | A | * | 11/1993 | Kosugi ................... 280/808 |
| 5,397,152 | A | | 3/1995 | Kawamura |
| 5,513,880 | A | * | 5/1996 | Ohira et al. ............. 280/808 |
| 5,556,171 | A | * | 9/1996 | Busch .................... 297/483 |
| 5,599,070 | A | * | 2/1997 | Pham et al. ............. 297/483 |
| 5,601,311 | A | * | 2/1997 | Pfeiffer et al. .......... 280/801.1 |
| 5,658,048 | A | | 8/1997 | Nemoto |
| 5,918,903 | A | * | 7/1999 | Ito ........................ 280/801.1 |
| 6,120,061 | A | | 9/2000 | Ito |

(Continued)

FOREIGN PATENT DOCUMENTS

EP         223582  A2  *  5/1987

(Continued)

*Primary Examiner*—Faye M. Fleming
*Assistant Examiner*—Laura Freedman
(74) *Attorney, Agent, or Firm*—Gifford, Krass, Sprinkle, Anderson & Citkowski, P.C.

(57) ABSTRACT

A seat belt shoulder guide having a plate with a flange protruding normally outwardly from the plate which defines an opening between the flange and the plate. A plastic insert is positioned in the opening. A belt opening is provided through the insert and this opening includes a linear central portion and an arcuate and transversely extending portion at each end. An antirotation lip is formed around the insert opening. In addition, a central aperture in the plate reduces the weight of the shoulder guide while reinforcing beads formed around the sides of the aperture rigidify the plate.

5 Claims, 4 Drawing Sheets

U.S. PATENT DOCUMENTS

| | | | |
|---|---|---|---|
| 6,217,070 B1 * | 4/2001 | Kopetzky et al. | 280/808 |
| 6,267,410 B1 | 7/2001 | Koketsu et al. | |
| 6,290,259 B1 * | 9/2001 | Drobot et al. | 280/808 |
| 6,315,328 B1 | 11/2001 | Iseki et al. | |
| 6,467,850 B1 * | 10/2002 | Kawai et al. | 297/468 |
| 6,520,588 B1 * | 2/2003 | Busch | 297/483 |
| 6,688,647 B2 * | 2/2004 | Koketsu | 280/808 |
| 6,726,287 B1 | 4/2004 | Janz | |
| 6,739,625 B2 | 5/2004 | Tomita et al. | |
| 7,390,022 B2 * | 6/2008 | Burghardt | 280/808 |
| 2005/0012321 A1 * | 1/2005 | Moendel et al. | 280/808 |
| 2005/0236828 A1 | 10/2005 | Noda et al. | |
| 2007/0138783 A1 * | 6/2007 | Gleason et al. | 280/808 |

FOREIGN PATENT DOCUMENTS

| | | |
|---|---|---|
| EP | 0 608 630 | 8/1994 |
| GB | 2 026 307 | 2/1980 |
| JP | 10-181522 | 7/1998 |
| JP | 11-278213 | 10/1999 |
| JP | 2000-272472 | 10/2000 |
| JP | 2001-088658 | 4/2001 |

* cited by examiner

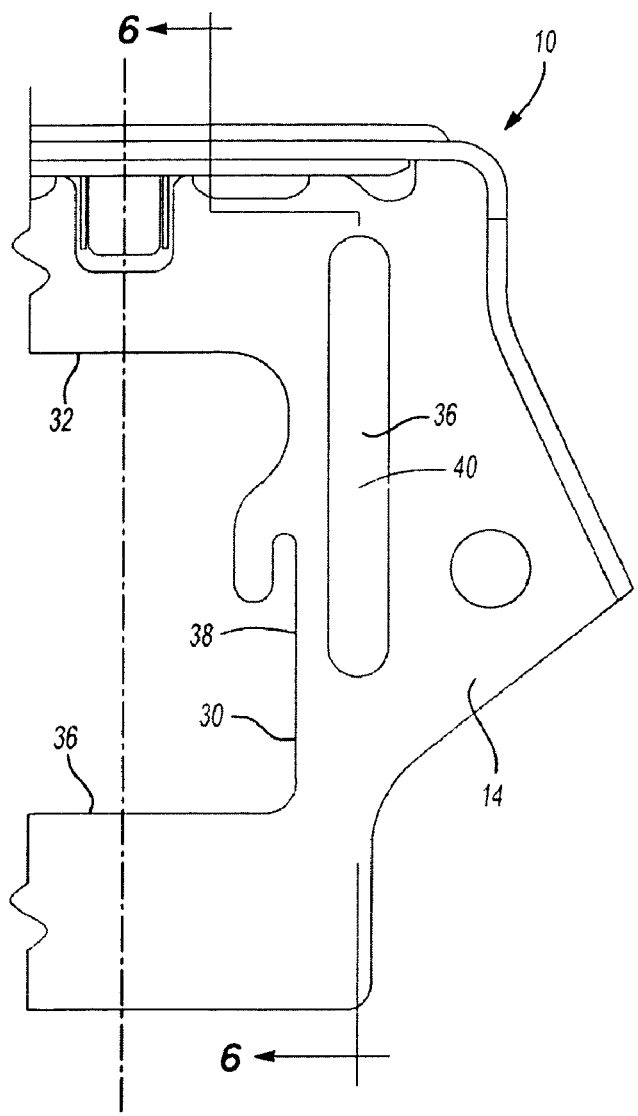
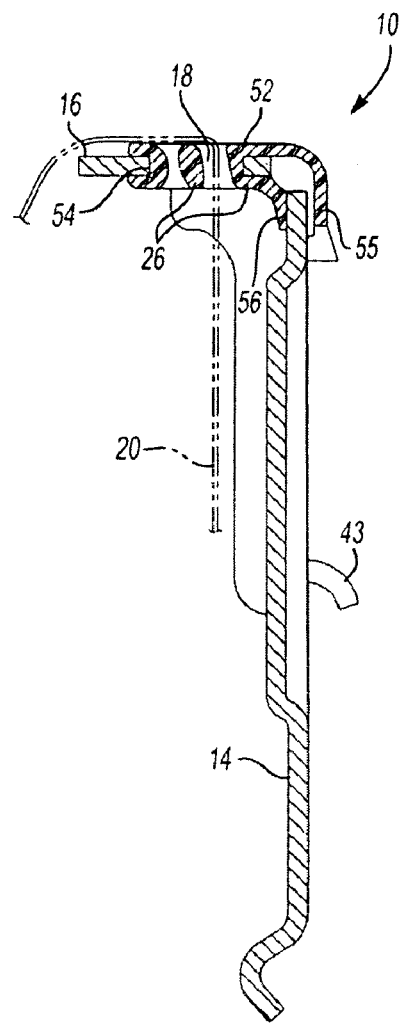
Fig-5
Fig-6

SEAT BELT SHOULDER GUIDE

RELATED APPLICATION

This application claims priority of U.S. Provisional Patent Application Ser. No. 60/765,686 filed Feb. 6, 2006, which is incorporated herein by reference.

BACKGROUND OF THE INVENTION

I. Field of the Invention

The present invention relates generally to a shoulder guide for an automotive seat belt.

II. Description of Related Art

Many automotive vehicles utilize seat belt shoulder guides for routing the seat belt over the shoulder of the vehicle occupant. These previously known shoulder guides typically include a metal panel welded to a bent wire frame. The panel is then secured to the automotive vehicle frame in any conventional fashion, such as by bolts.

These previously known seat belt shoulder guides, however, suffer from a number of disadvantages. One such disadvantage of the previously known seat belt shoulder guides is that such shoulder guides are susceptible to both seat belt rotation within the guide as well as jamming of the seat belt within the guide. Such rotation and/or jamming of the seat belt within the guide is inconvenient for the vehicle occupant in utilizing the seat belt.

Furthermore, such previously known seat belt shoulder guides were relatively heavy thus adding to the overall weight of the vehicle.

SUMMARY OF THE PRESENT INVENTION

The present invention provides a seat belt shoulder guide which overcomes all of the above-mentioned disadvantages of the previously known seat belt shoulder guides.

In brief, the seat belt shoulder guide of the present invention comprises a plate having a flange protruding laterally outwardly from the plate adjacent its top. An opening is defined between the flange and the plate and a plastic insert is snap fit into the opening and locked to the plate and flange. The flange and the plate are also preferably of a one-piece metal construction.

A belt opening is provided through the insert and this belt opening includes a linear central portion and an arcuate and transversely extending portion at each end. An antirotation lip is formed around and extends normally outwardly from the belt opening in the insert. When in use, the combination of the arcuate ends of the insert opening as well as the antirotation lip around the insert opening minimizes the risk of seat belt rotation in the guide as well as jamming of the seat belt in the guide.

The plate preferably includes a central aperture adjacent to the flange. This central aperture is generally rectangular in shape and includes an outwardly extending reinforcing bead formed along the sides of the aperture. The removal of the central aperture advantageously reduces the overall weight of the seat belt shoulder guide while the reinforcing beads reinforce the overall strength of the seat belt shoulder guide.

A seat belt web guide also protrudes outwardly from the plate along the bottom of the aperture. This guide is of a one-piece construction with the plate.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 5 is a fragmentary front view of the preferred embodiment of the invention; and FIG. 6 is a sectional view taken along line 6-6 in FIG. 5.

DETAILED DESCRIPTION OF A PREFERRED EMBODIMENT OF THE PRESENT INVENTION

Figure 1:
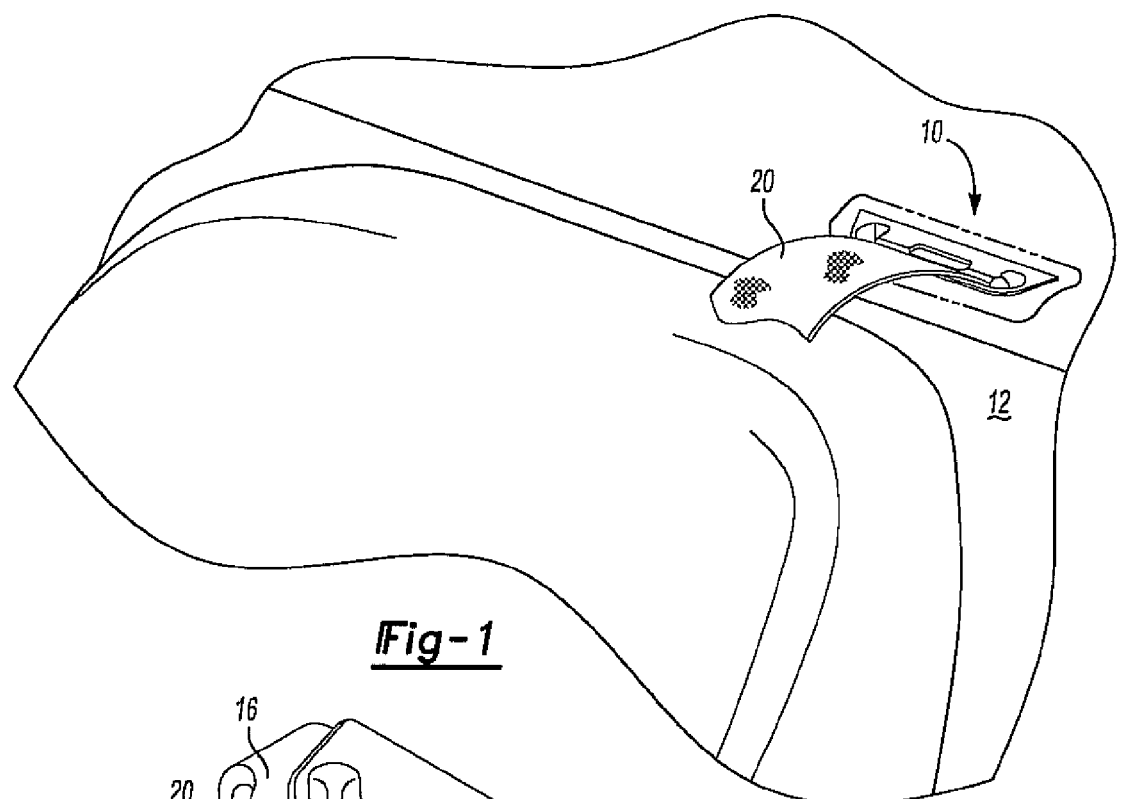
FIG. 1 is an elevational diagrammatic view illustrating a preferred embodiment of the seat belt shoulder guide installed in an automotive vehicle.

With reference first to FIG. 1, a preferred embodiment of the seat belt shoulder guide 10 is shown installed in an automotive vehicle 12 (illustrated only partially). The automotive vehicle 12 may comprise any type of automotive vehicle, and the shoulder guide 10 is secured to the frame of the vehicle 12 above and to one side of the shoulder of a vehicle occupant when seated.

With reference now to FIGS. 2-6, the seat belt shoulder guide 10 is there shown in greater detail and includes a generally planar plate 14 having a flange 16 protruding normally outwardly from the top of the plate 14. Preferably, the plate 14 and flange 16 are of a one-piece metal construction and the flange 16 and plate 14 together define an opening 50 in the top of the shoulder guide 10.

Figure 3:
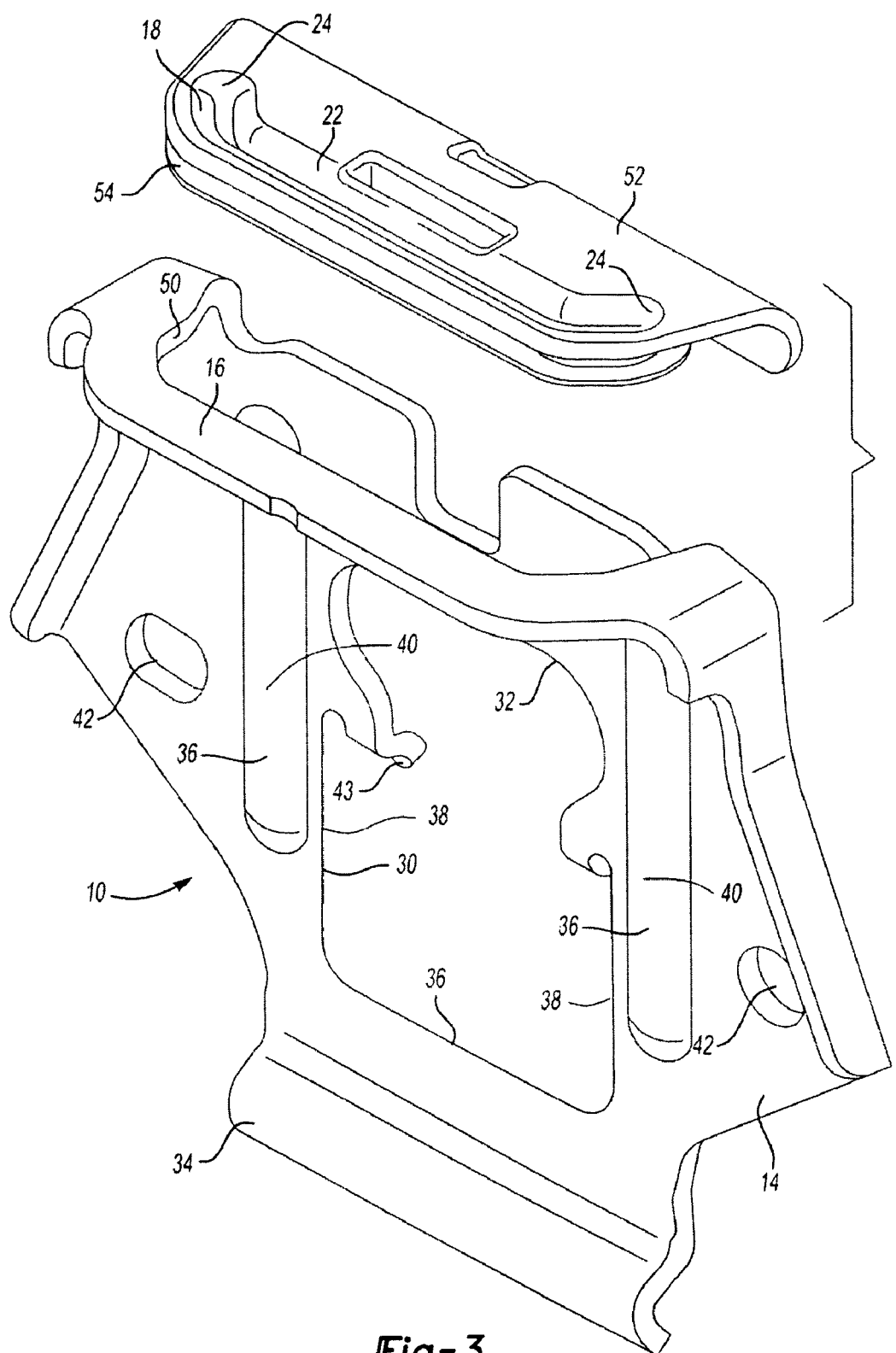
FIG. 3 is an exploded front elevational view of the preferred embodiment of the seat belt shoulder guide.
Figure 4:
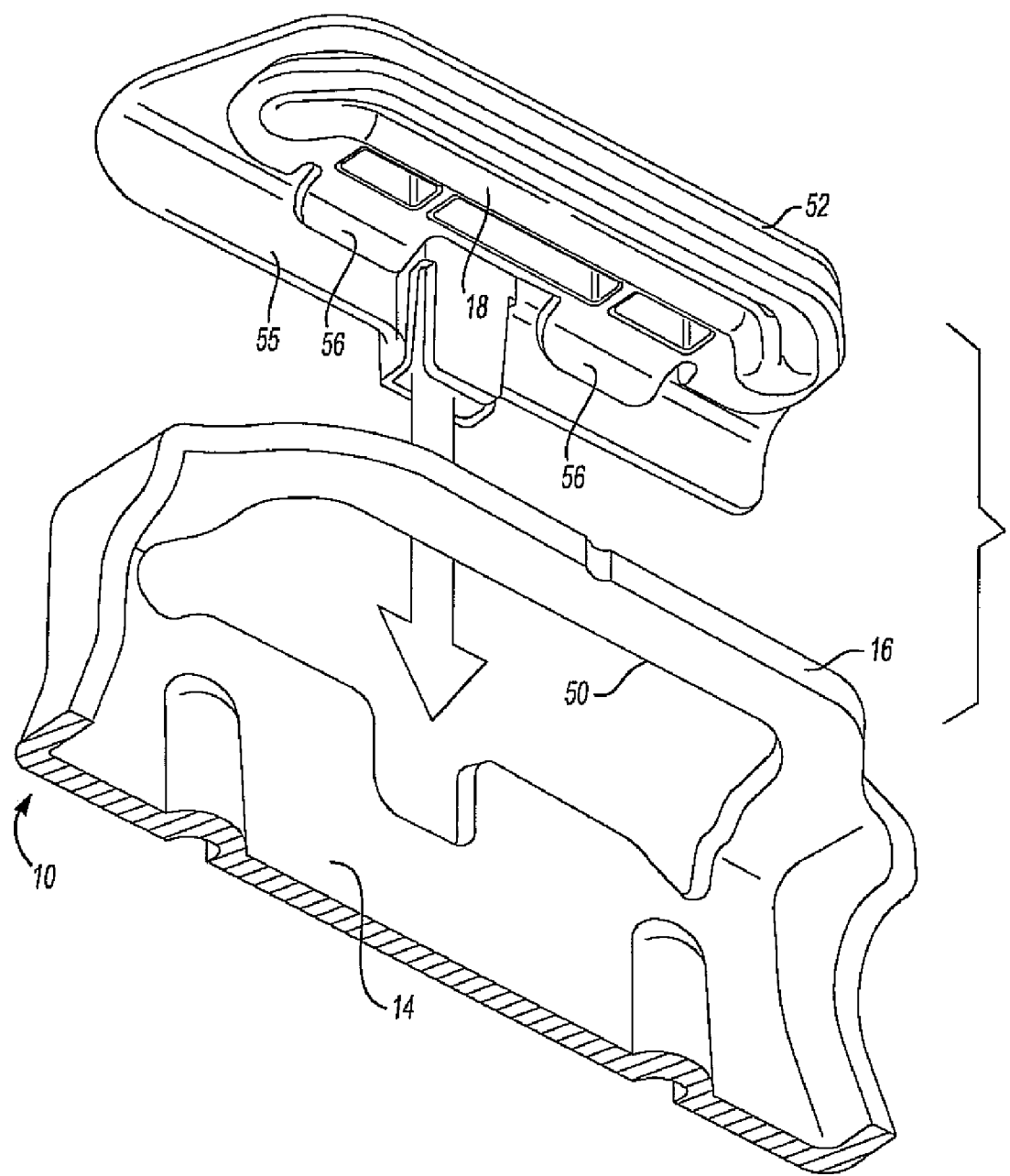
FIG. 4 is a fragmentary, exploded bottom elevational view of the preferred embodiment of the invention.

An insert 52, preferably made of plastic, is positioned within the opening 50. As best shown in FIGS. 3 and 6, in order to lock the insert 52 to the plate 14 and flange 16, the insert 52 includes a channel 54 around its forward end dimensioned to receive the flange 16. Similarly, a portion of the plate 14 is resiliently retained between a rear wall 55 of the insert 52 and a pair of resilient locking tabs 56 on the insert 52.

Figure 2:
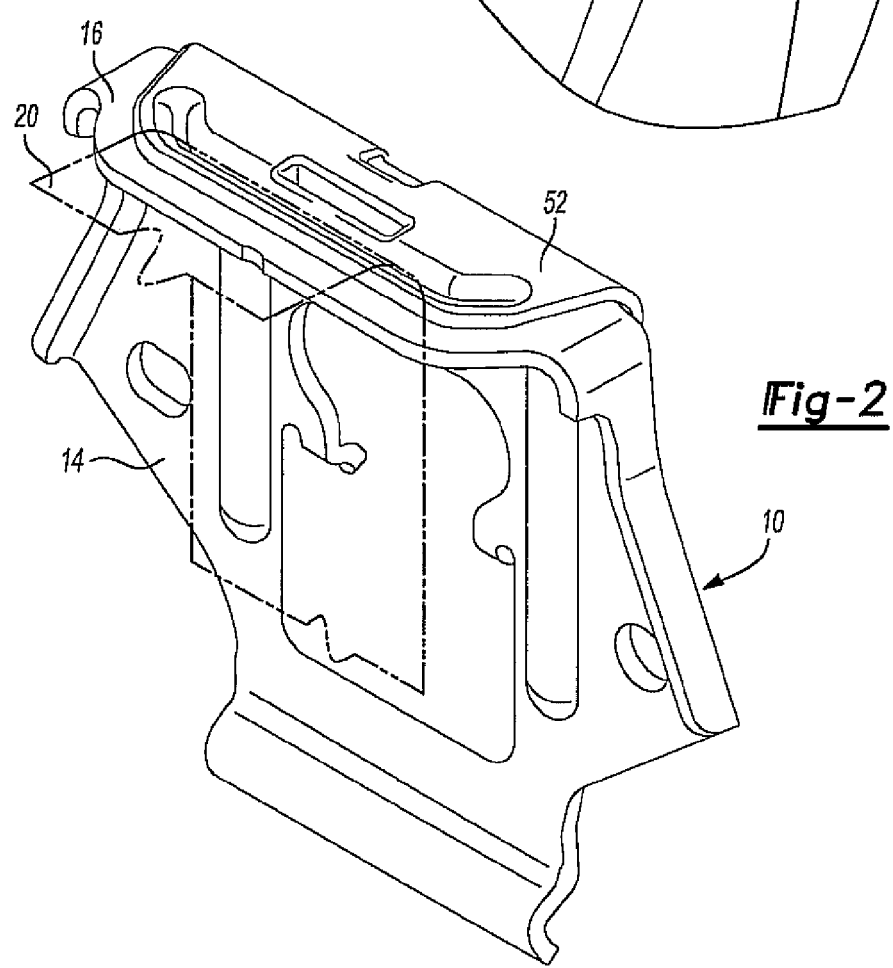
FIG. 2 is a front elevational view illustrating the preferred embodiment of the seat belt shoulder guide.

An opening 18 in the insert 52 is dimensioned to slidably receive a web 20 (FIGS. 1 and 2) of a seat belt. This opening 18, furthermore, includes an elongated linear central portion 22 (FIG. 3) as well as an arcuate and transversely extending portion 24 at each end (FIG. 2).

With reference now particularly to FIG. 6, an antirotation lip 26 is provided around the insert opening 18.

Referring again to FIGS. 3 and 5, a central aperture 30 is provided through the plate 14. This aperture 30 is generally rectangular in shape and is positioned through the plate 14 so that the flange 16 extends along an adjacent an upper end 32 of the aperture 30. A web guide 34 is formed in the plate 14 so that the guide 34 is generally parallel to and spaced apart from the flange 16 and extends along a lower side 36 of the aperture 30 and thus on the opposite side of the aperture 30 from the flange 16. Additionally, reinforcing beads 36 are also formed in and protrude outwardly from the plate 14 adjacent the sides 38 of the aperture 30. Each reinforcing bead 36, furthermore, includes a generally rounded outer surface 40.

Referring now to FIG. 3, a pair of mounting holes 42 are also provided through the plate 14 for securing the seat belt shoulder guide 10 to the frame of the automotive vehicle 12. Any conventional fastener, such as a bolt, may be used to secure the seat belt shoulder guide 10 to the vehicle frame 12. Additionally, the plate 14 optionally includes locating tabs 43 to facilitate positioning the shoulder guide 10 on the vehicle frame.

In operation, after the seat belt shoulder guide 14 has been secured to the vehicle frame 12, the seat belt web 20 (FIG. 3) is positioned through the insert opening 18 so that the web 20 extends across the central aperture 30.

In operation, the shape of the insert opening 18 with its arcuate ends 24 together with the antirotation lip 26 also serves to minimize twisting and potentially jamming the seat belt within the seat belt shoulder guide 14. This, in turn, enhances the ease of use for the vehicle occupant.

The provision of the central opening 30 in the plate 14 also serves to minimize the overall weight of the seat belt shoulder guide 10. The reinforcing beads 36, however, adequately compensate for any reduction in either the rigidity or strength of the seat belt shoulder guide 14 caused by the aperture 30.

From the foregoing, it can be seen that the present invention provides a simple and yet highly effective seat belt shoulder guide for use in automotive vehicles. Having described my invention, however, many modifications thereto will become apparent to those skilled in the art to which it pertains without deviation from the spirit of the invention as defined by the scope of the appended claims.

We claim:

1. A seat belt shoulder guide comprising:

a plate, a flange protruding outwardly from an upper end of said plate, said plate and said flange forming an opening, an insert lockingly positioned in said opening, wherein said insert includes a channel dimensioned to receive an edge of said flange, a wall dimensioned to overlap a portion of said plate and at least one locking tab dimensioned to engage said portion of said plate on the side of said plate opposite from said wall, the insert formed relative to the flange and plate, a belt opening provided through said insert, said belt opening having a linear central portion and an arcuate angled portion at each end, said insert having an antirotation lip formed around said belt opening, a central aperture in said plate and aligned with said flange, wherein said plate includes a web guide protruding outwardly from a bottom of said central aperture.

2. The invention as defined in claim 1 wherein said insert comprises a plastic material.

3. The invention as defined in claim 1 wherein said flange extends substantially normally outwardly from said plate.

4. The invention as defined in claim 1 wherein said flange and said plate are of a one-piece construction.

5. The invention as defined in claim 1 and comprising a pair of reinforcing beads protruding outwardly from said plate, said reinforcing beads being disposed on opposite sides of said central aperture.

* * * * *

UNITED STATES PATENT AND TRADEMARK OFFICE
CERTIFICATE OF CORRECTION

PATENT NO.        : 7,566,075 B2
APPLICATION NO.   : 11/671269
DATED             : July 28, 2009
INVENTOR(S)       : Aaron Robert Latour et al.

It is certified that error appears in the above-identified patent and that said Letters Patent is hereby corrected as shown below:

Column 3, line 1 replace "14" with --10--

Column 3, line 8 replace "14" with --10--

Column 3, line 14 replace "14" with --10--

Signed and Sealed this

Sixth Day of October, 2009

David J. Kappos
*Director of the United States Patent and Trademark Office*